(12) United States Patent
Xotta et al.

(10) Patent No.: US 12,271,592 B2
(45) Date of Patent: Apr. 8, 2025

(54) INDEPENDENT PLANE ARCHITECTURE IN A MEMORY DEVICE

(71) Applicant: Micron Technology, Inc., Boise, ID (US)

(72) Inventors: Andrea Giovanni Xotta, Avezzano (IT); Dheeraj Srinivasan, San Jose, CA (US); Ali Mohammadzadeh, Mountain View, CA (US); Karl D. Schuh, Santa Cruz, CA (US); Guido Luciano Rizzo, Avezzano (IT); Jung Sheng Hoei, Newark, CA (US); Michele Piccardi, Cupertino, CA (US); Tommaso Vali, Sezze (IT); Umberto Siciliani, Rubano (IT); Rohitkumar Makhija, Milpitas, CA (US); June Lee, Sunnyvale, CA (US); Aaron S. Yip, Los Gatos, CA (US); Daniel J. Hubbard, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 170 days.

(21) Appl. No.: 17/887,940

(22) Filed: Aug. 15, 2022

(65) Prior Publication Data
US 2023/0059543 A1    Feb. 23, 2023

Related U.S. Application Data

(60) Provisional application No. 63/260,337, filed on Aug. 17, 2021.

(51) Int. Cl.
*G11C 13/00*    (2006.01)
*G06F 3/06*    (2006.01)

(52) U.S. Cl.
CPC ............ *G06F 3/061* (2013.01); *G06F 3/0629* (2013.01); *G06F 3/0679* (2013.01)

(58) Field of Classification Search
CPC ....... G06F 3/061; G06F 3/0629; G06F 3/0679
See application file for complete search history.

(56) References Cited

U.S. PATENT DOCUMENTS

2016/0071605 A1* 3/2016 Moschiano ......... G11C 11/5642
                                                                365/185.12
2016/0247563 A1* 8/2016 Perner ................... G11C 5/025
(Continued)

*Primary Examiner* — Min Huang
(74) *Attorney, Agent, or Firm* — Lowenstein Sandler LLP

(57) ABSTRACT

A memory device includes a memory array comprising a plurality of memory planes, wherein the plurality of memory planes are arranged in a plurality of independent plane groups, and wherein each of the plurality of independent plane groups comprises one or more of the plurality of memory planes. The memory device further includes a plurality of independent analog driver circuits coupled to the memory array, wherein a respective one of the plurality of independent analog driver circuits is associated with a respective one of the plurality of independent plane groups. The memory device further includes a common analog circuit coupled to the memory array, wherein the common analog circuit is shared by the plurality of independent analog driver circuits and the plurality of independent plane groups. The memory device further includes a plurality of control logic elements, wherein a respective one of the plurality of control logic elements is associated with a respective one of the plurality of independent analog driver circuits and a respective one of the plurality of independent plane groups.

17 Claims, 7 Drawing Sheets

(56) References Cited

U.S. PATENT DOCUMENTS

2021/0124527 A1\* 4/2021 Kwon .............. B60W 50/0098
2022/0059171 A1\* 2/2022 Goss ..................... G11C 16/30

\* cited by examiner

INDEPENDENT PLANE ARCHITECTURE IN A MEMORY DEVICE

RELATED APPLICATIONS

This application claims the benefit of U.S. Provisional Patent Application No. 63/260,337, filed Aug. 17, 2021, the entire contents of which are hereby incorporated by reference herein.

TECHNICAL FIELD

Embodiments of the disclosure relate generally to memory sub-systems, and more specifically, relate to an independent plane architecture in a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
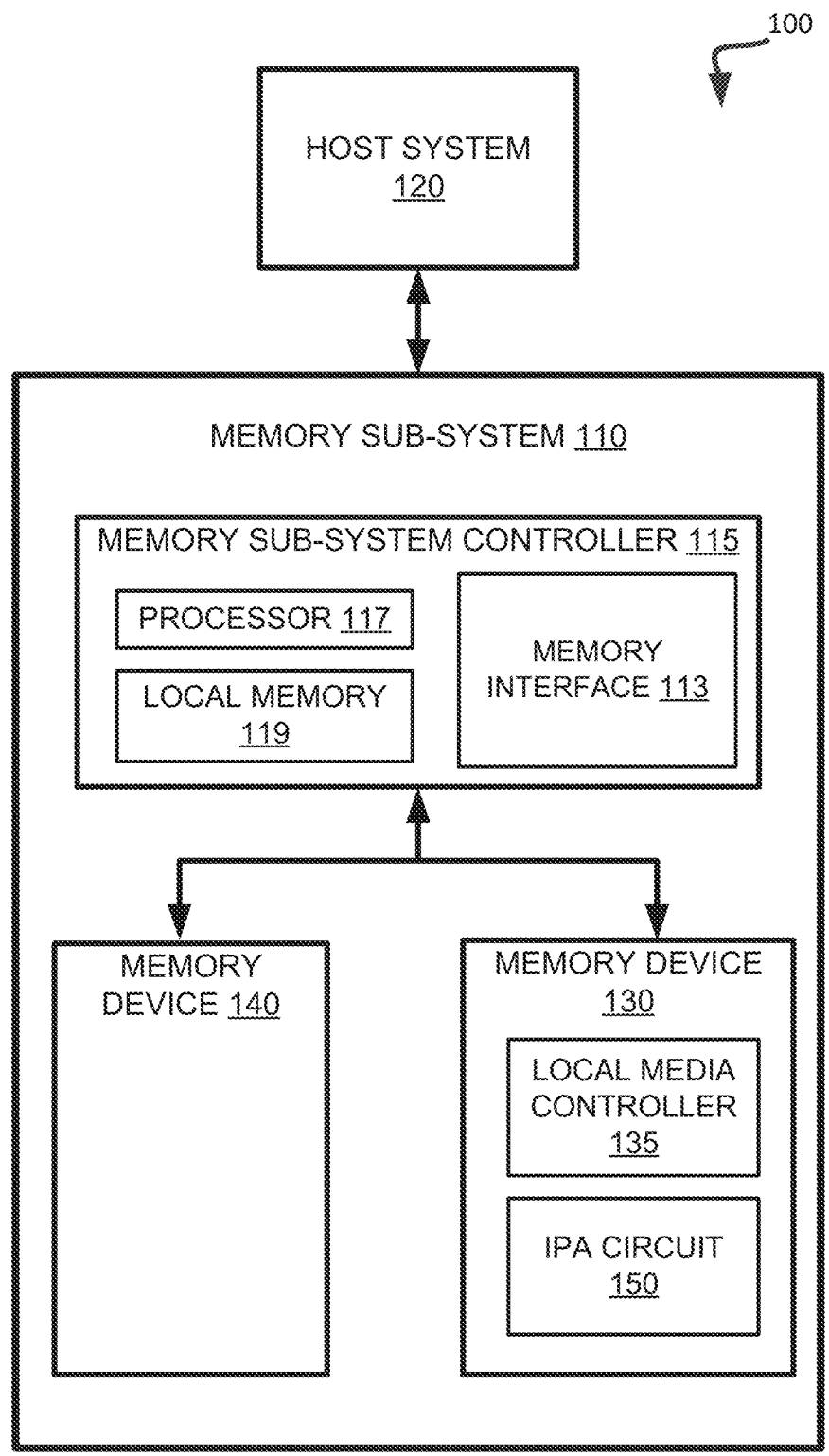
FIG. 1 illustrates an example computing system that includes a memory sub-system in accordance with some embodiments of the present disclosure.

Aspects of the present disclosure are directed to an independent plane architecture in a memory device of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits.

In certain multi-plane memory devices, a given memory die is limited to performing a single programming operation at any one time. Different types of programming operations can be performed (e.g., single-page program operations, multi-page program operations), but regardless of the type, only one operation can be performed at a time. In a single-page program operation, the page of data to be programmed is received (e.g., from a memory sub-system controller or host system) and the program operation is executed on a single plane of the multi-plane memory device. During the single-page program operation, the remaining planes of the memory device are inaccessible to the memory sub-system controller and host system (i.e., all planes appear "busy" even though only a single plane is actually being utilized). In a multi-page program operation, multiple pages of data are received and, once all of the multiple pages are received, the program operation is executed on multiple planes of the multi-plane memory device. Thus, for both a single-page program operation and a multi-plane program operation, no other memory access operations (e.g., program, read, or erase operations) can be performed on the memory device concurrently.

Certain memory devices attempt to improve performance by enabling concurrent memory access operations to be performed asynchronously. Doing so can improve the quality of service in mixed workloads (e.g., a mix of program and read operations), increase the write throughput of the memory device, increase the write granularity (e.g., smaller block size), and reduce buffer requirements (i.e., since a smaller amount of data is used to execute a program operation). To enable concurrent memory access operations, certain memory devices utilize multiple memory dies in a memory sub-system, such that separate memory access operation could be performed asynchronously on each memory die. Such an approach increases area of the memory device (thereby increasing cost), has higher power utilization for the multiple required circuit elements, and is subject to packaging limitations. Other memory devices attempt to implement separate memory devices within a single die, but such an approach also suffers from increased power utilization.

Aspects of the present disclosure address the above and other deficiencies by providing independent plane architecture in a memory device of a memory sub-system. In one embodiment, the memory device is a multi-plane memory device including multiple memory planes. In one embodiment, the multiple memory planes are logically and physically divided into two or more independent plane groups, which each independent plane group including a separate set of one or more memory planes. In one embodiment, each independent plane group has a corresponding respective analog driver circuit (or set of analog driver circuits) used to apply voltage signals to the memory planes in the corresponding independent plane groups. In one embodiment, the two or more independent plane groups also share a common analog circuit (or set of common analog circuits) in order to reduce power consumption and area usage in the memory device. In one embodiment, each of the independent plane groups has a corresponding respective media controller. Each controller is configured to execute memory access operations on the memory planes in the corresponding independent plane group (e.g., cause the corresponding respective analog driver circuit to apply a voltage signal received from the common analog circuit to a certain memory plane or memory planes of the corresponding independent plane group). In one embodiment, the media controller associated with one independent plane group is designated as a "main" controller, while the media controllers associated with the other independent plane groups are designated as "secondary" controllers. Under certain circumstances, the secondary controller(s) can be disabled for power consumption purposes, and the primary controller can execute operations on the memory planes of multiple independent plane groups. For example, in a mobile device where power savings are more important, and when a sequential write workload is being performed, the benefits of concurrent access to independent plane groups may not be worthwhile, so the secondary controllers can be disabled and the memory device can function in a legacy mode. When the secondary controllers are enabled, however, the memory device featuring the independent plane architecture described herein can perform asynchronous memory access operations on the memory planes of each independent plane group concurrently (e.g., at least partially overlapping in time).

Advantages of this approach include, but are not limited to, improved performance in the memory sub-system. The independent plane architecture provides improved quality of service in mixed write and read workloads, improves the write throughput by allowing concurrent write operations to be performed on separate plane groups, increases the write granularity (i.e., by using a smaller block size), and reduces the buffer requirements for the memory sub-system controller since a smaller amount of data needs to be held during a write operation. The ability to disable secondary controllers in the memory device reduces power consumption for legacy operations when only a single media controller is activated. In addition, the independent plane architecture reduces disturbances induced by concurrent noisy and sensitive operations by providing proper power delivery segregation.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface, Open NAND Flash Interface (ONFI) interface, or some other interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. In some embodiments, the memory sub-system controller 115 includes at least a portion of the memory interface 113. For example, the memory sub-system controller 115 can include a processor 117 (e.g., a processing device) configured to execute instructions stored in local memory 119 for performing the operations described herein. In some embodiments, the memory interface component 113 is part of the host system 110, an application, or an operating system.

In one embodiment, memory device 130 a memory array (not shown) with multiple planes arranged into a number of independent plane groups. Memory device 130 further includes local media controller 135 and independent plane architecture (IPA) circuitry 150. In one embodiment, circuitry 150 includes a number of independent analog driver circuits coupled to the memory array, where each respective independent analog driver circuit is associated with a corresponding independent plane group (i.e., a one to one relationship), and a common analog circuit coupled to the memory array, where the common analog circuit is shared by all of the independent analog driver circuits and independent plane groups. In one embodiment, the independent analog driver circuits are configured to provide selected analog voltage references received from the common analog circuit to memory planes of the independent plane groups in order to perform memory access operations at the direction of local media controller 135.

In one embodiment, local media controller 135 can represent a number of separate media controllers. For example, each independent plane group of the memory array can include a corresponding respective media controller. Each media controller is configured to execute memory access operations on the memory planes in the corresponding independent plane group (e.g., cause the corresponding respective analog driver circuit to apply a voltage signal received from the common analog circuit to a certain memory plane or memory planes of the corresponding independent plane group). In one embodiment, the media controller associated with one independent plane group is designated as a "main" controller, while the media controllers associated with the other independent plane groups are designated as "secondary" controllers. Under certain circumstances, the secondary controller(s) can be disabled for power consumption purposes, and the primary controller can execute operations on the memory planes of multiple independent plane groups. Further details with regards to the operations of local media controller 135 and independent plane architecture (IPA) circuitry 150 are described below.

Figure 2:
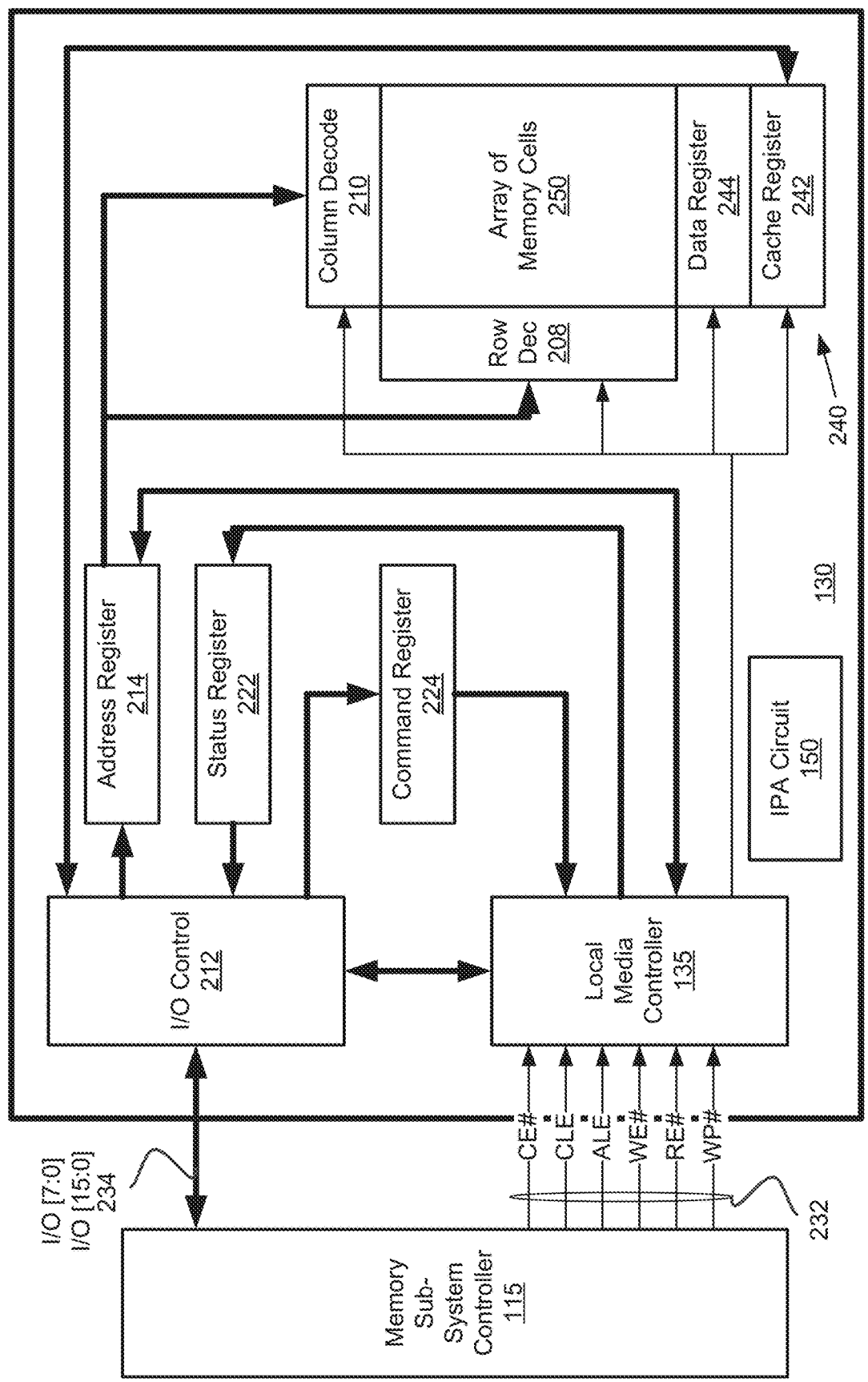
FIG. 2 is a block diagram of a memory device in communication with a memory sub-system controller of a memory sub-system, according to an embodiment.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 250 logically arranged in rows and columns. Memory cells of a logical row are typically connected to the same access line (e.g., a word line) while memory cells of a logical column are typically selectively connected to the same data line (e.g., a bit line). A single access line may be associated with more than one logical row of memory cells and a single data line may be associated with more than one logical column. Memory cells (not shown in FIG. 2) of at least a portion of array of memory cells 250 are capable of being programmed to one of at least two target data states.

Row decode circuitry 208 and column decode circuitry 210 are provided to decode address signals. Address signals are received and decoded to access the array of memory cells 250. Memory device 130 also includes input/output (I/O) control circuitry 212 to manage input of commands, addresses and data to the memory device 130 as well as output of data and status information from the memory device 130. An address register 214 is in communication with I/O control circuitry 212 and row decode circuitry 208 and column decode circuitry 210 to latch the address signals prior to decoding. A command register 224 is in communication with I/O control circuitry 212 and local media controller 135 to latch incoming commands.

A controller (e.g., the local media controller 135 internal to the memory device 130) controls access to the array of memory cells 250 in response to the commands and generates status information for the external memory sub-system controller 115, i.e., the local media controller 135 is configured to perform access operations (e.g., read operations, programming operations and/or erase operations) on the array of memory cells 250. The local media controller 135 is in communication with row decode circuitry 208 and column decode circuitry 210 to control the row decode circuitry 208 and column decode circuitry 210 in response to the addresses.

The local media controller 135 is also in communication with a page cache 240 including cache register 242 and data register 244. Cache register 242 latches data, either incoming or outgoing, as directed by the local media controller 135 to temporarily store data while the array of memory cells 250 is busy writing or reading, respectively, other data. During a program operation (e.g., write operation), data may be passed from the cache register 242 to the data register 244 for transfer to the array of memory cells 250; then new data may be latched in the cache register 242 from the I/O control circuitry 212. During a read operation, data may be passed from the cache register 242 to the I/O control circuitry 212 for output to the memory sub-system controller 115; then new data may be passed from the data register 244 to the cache register 242. The cache register 242 and/or the data register 244 may form (e.g., may form a portion of) page cache 240 of the memory device 130. Page cache 240 may further include sensing devices (not shown in FIG. 2) to sense a data state of a memory cell of the array of memory cells 250, e.g., by sensing a state of a data line connected to that memory cell. A status register 222 may be in communication with I/O control circuitry 212 and the local memory controller 135 to latch the status information for output to the memory sub-system controller 115.

Memory device 130 further includes independent plane architecture (IPA) circuitry 150. In one embodiment, IPA circuitry 150 includes a number of independent analog driver circuits coupled to the memory array 250, where each respective independent analog driver circuit is associated with a corresponding independent plane group, and a common analog circuit coupled to the memory array, where the common analog circuit is shared by all of the independent analog driver circuits and independent plane groups. In one embodiment, the independent analog driver circuits are configured to provide selected analog voltage references received from the common analog circuit to memory planes of the independent plane groups in order to perform memory access operations at the direction of local media controller 135. Additional details regarding IPA circuit 150 are provided below with respect to FIG. 4.

Memory device 130 receives control signals at the memory sub-system controller 115 from the local media controller 135 over a control link 232. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 232 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 234 and outputs data to the memory sub-system controller 115 over I/O bus 234.

For example, the commands may be received over input/output (I/O) pins [7:0] of I/O bus 234 at I/O control circuitry 212 and may then be written into command register 224. The addresses may be received over input/output (I/O) pins [7:0] of I/O bus 234 at I/O control circuitry 212 and may then be written into address register 214. The data may be received over input/output (I/O) pins [7:0] for an 8-bit device or input/output (I/O) pins [15:0] for a 16-bit device at I/O control circuitry 212 and then may be written into cache register 242. The data may be subsequently written into data register 244 for programming the array of memory cells 250.

In an embodiment, cache register 242 may be omitted, and the data may be written directly into data register 244. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 2 has been simplified. It should be recognized that the functionality of the various block components described with reference to FIG. 2 may not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) may be used in the various embodiments.

Figure 3:
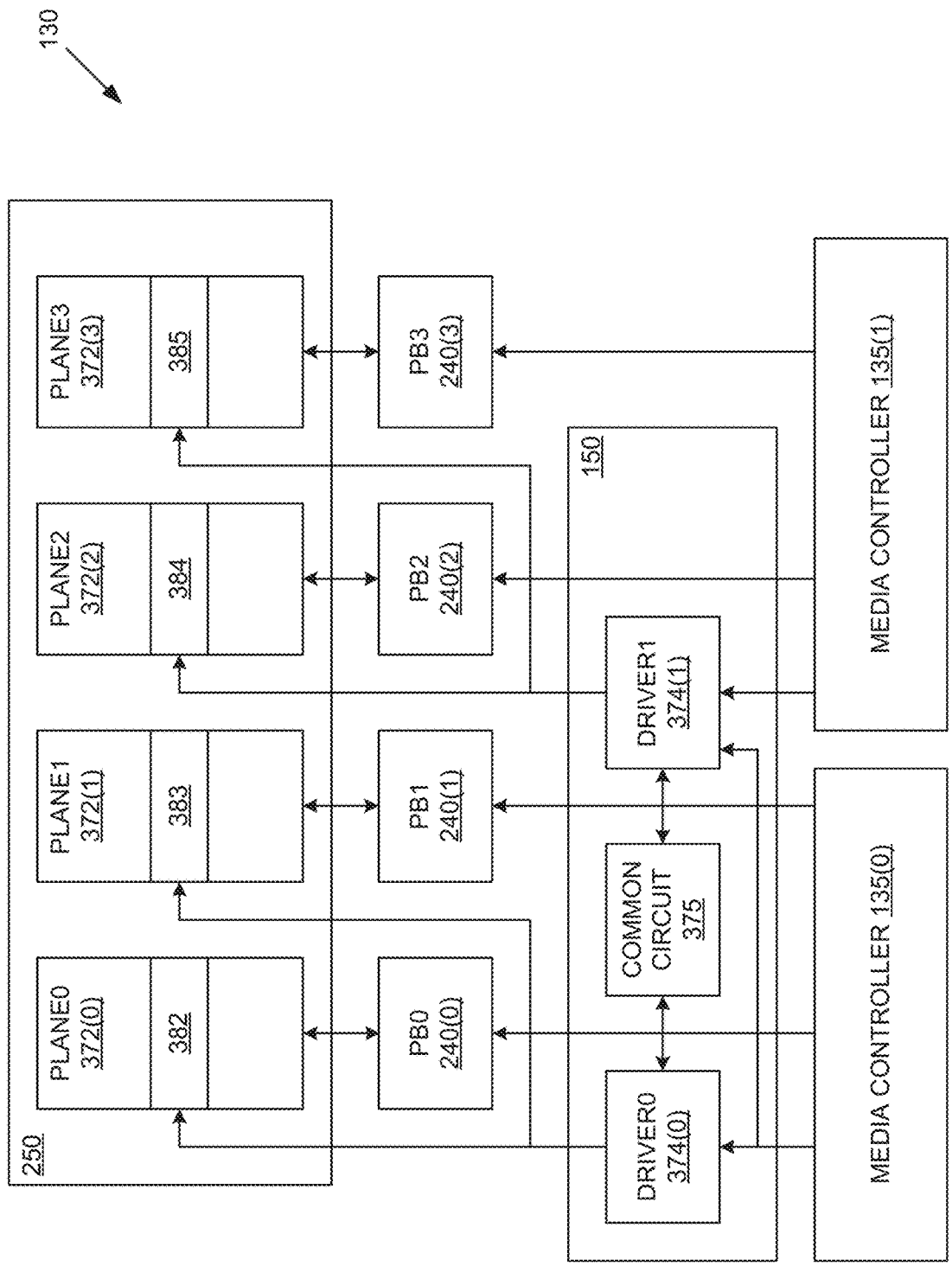
FIG. 3 is a block diagram illustrating a multi-plane memory device configured for concurrent page cache resource access in accordance with some embodiments of the present disclosure.

FIG. 3 is a block diagram illustrating a multi-plane memory device 130 configured for concurrent page cache resource access in accordance with some embodiments of the present disclosure. The memory planes 372(0)-372(3) can each be divided into blocks of data, with a different relative block of data from two or more of the memory planes 372(0)-372(3) concurrently accessible during memory access operations. For example, during memory access operations, two or more of data block 382 of the memory plane 372(0), data block 383 of the memory plane 372(1), data block 384 of the memory plane 372(2), and data block 385 of the memory plane 372(3) can each be accessed concurrently.

The memory device 130 includes a memory array 250 divided into memory planes 372(0)-372(3) that each includes a respective number of memory cells. The multi-plane memory device 130 can further include local media controllers 135(0)-135(1) coupled to memory array 250. The memory cells can be non-volatile memory cells, such as NAND flash cells, or can generally be any type of memory cells. In one embodiment, each of memory planes 372(0)-372(3) includes a respective memory array of memory cells. In one embodiment, each of memory planes 372(0)-372(3) can include two or more independent memory arrays of memory cells.

Each of the memory planes 372(0)-372(3) can be coupled to a respective page buffer 240(0)-240(3). Each page buffer 240(0)-240(3) can be configured to provide data to or receive data from the respective memory plane 372(0)-372(3). The page buffers 240(0)-240(3) can be controlled by local media controllers 135(0)-135(1). Data received from the respective memory plane 372(0)-372(3) can be latched at the page buffers 240(0)-240(3), respectively, and retrieved by local media controllers 135(0)-135(1), and provided to the memory sub-system controller 115 via the NVMe interface.

In one embodiment, memory planes 372(0)-372(3) of memory array 250 can be arranged in multiple independent plane groups. For example, memory planes 372(0)-372(1) could be part of a first independent plane group and memory planes 372(2)-372(3) could be part of a second independent plane group. This is merely one example, and it should be understood that other arrangements are possible including a different number of groups and/or a different number of planes in each group. In one embodiment, the memory planes of each independent plane group are coupled to a respective access driver circuit 374(0)-374(1), such as an access line driver circuit. In one embodiment, the driver circuits 374(0)-374(1) are part of independent plane access circuit 150. The driver circuits 374(0)-374(1) can be configured to condition a page of a respective block of an associated memory plane 372(0)-372(3) for a memory access operation, such as programming data (i.e., writing data), reading data, or erasing data. Each of the driver circuits 374(0)-374(1) can be coupled to a respective global access lines associated with a respective memory plane 372(0)-372(3). Each of the global access lines can be selectively coupled to respective local access lines within a block of a plane during a memory access operation associated with a page within the block. The driver circuits 374(0)-374(1) can be controlled based on signals from local media controllers 135(0)-135(1). Each of the driver circuits 374(0)-374(1) can include or be coupled to a respective power circuit, and can provide voltages to respective access lines based on voltages provided by the respective power circuit. The voltages provided by the power circuits can be based on signals received from local media controllers 135(0)-135(1). In one embodiment, independent plane access circuit further includes common analog circuit 375, which is shared by all of the independent analog driver circuits 374(0)-374(1) and independent plane groups.

The local media controllers 135(0)-135(1) can control the driver circuits 374(0)-374(1) and page caches 240(0)-240(3) to concurrently perform memory access operations associated with each of a group of memory command and address pairs (e.g., received from memory sub-system controller 115). For example, local media controller 135(0) can control the driver circuit 374(0) and local media controller 135(1) can control driver circuit 374(1) to perform the concurrent memory access operations. Local media controllers 135(0)-135(1) can include a power control circuit that serially configures two or more of the driver circuits 374(0)-374(3) for the concurrent memory access operations, and an access control circuit configured to control two or more of the buffers 240(0)-240(3) to sense and latch data from the respective memory planes 372(0)-372(3), or program data to the respective memory planes 372(0)-372(3) to perform the concurrent memory access operations.

In operation, local media controllers 135(0)-135(1) can receive a group of memory command and address pairs via the ONFI bus, with each pair arriving in parallel or serially. In some examples, the group of memory command and address pairs can each be associated with different respective memory planes 372(0)-372(3) of the memory array 250. The local media controller 135 can be configured to perform concurrent memory access operations (e.g., read operations or program operations) for the different memory planes 372(0)-372(3) of the memory array 250 responsive to the group of memory command and address pairs. For example, the power control circuit of local media controllers 135(0)-135(1) can serially configure, for the concurrent memory access operations based on respective page type (e.g., UP, MP, LP, XP, SLC/MLC/TLC/QLC page), the driver circuits 374(0)-374(1) for two or more memory planes 372(0)-372(3) associated with the group of memory command and address pairs. After the access line driver circuits 374(0)-374(1) have been configured, the access control circuit of local media controller 135 can concurrently control the page caches 240(0)-240(3) to access the respective pages of each of the two or more memory planes 372(0)-372(3) associated with the group of memory command and address pairs, such as retrieving data or writing data, during the concurrent memory access operations. For example, the access control circuit can concurrently (e.g., in parallel and/or contemporaneously) control the page caches 240(0)-240(3) to charge/discharge bitlines, sense data from the two or more memory planes 372(0)-372(3), and/or latch the data.

Based on the signals received from local media controllers 135(0)-135(1), the driver circuits 374(0)-374(1) that are coupled to the memory planes 372(0)-372(3) associated with the group of memory command and address command pairs can select blocks of memory or memory cells from the associated memory plane 372(0)-372(3), for memory operations, such as read, program, and/or erase operations. The driver circuits 374(0)-374(1) can drive different respective global access lines associated with a respective memory plane 372(0)-372(3). As an example, the driver circuit 374(0) can drive a first voltage on a first global access line associated with the memory plane 372(0) and/or 372(1), and the driver circuit 374(1) can drive a second voltage on a third global access line associated with the memory plane 372(2) and/or 372(3). In some examples, pass voltages can be provided on all access lines except an access line associated with a page of a memory plane 372(0)-372(3) to be accessed. The local media controllers 135(0)-135(1), the driver circuits 374(0)-374(1) can allow different respective pages, and the page caches 240(0)-240(3) within different respective blocks of memory cells, to be accessed concurrently. For example, a first page of a first block of a first memory plane can be accessed concurrently with a second page of a second block of a second memory plane, regardless of page type.

The page caches 240(0)-240(3) can provide data to or receive data from the local media controllers 135(0)-135(1) during the memory access operations responsive to signals from the local media controllers 135(0)-135(1) and the respective memory planes 372(0)-372(3). The local media controllers 135(0)-135(1) can provide the received data to memory sub-system controller 115.

It will be appreciated that the memory device 130 can include more or less than four memory planes, driver circuits, and page caches. It will also be appreciated that the respective global access lines can include 8, 16, 32, 64, 128, etc., global access lines. The local media controllers 135(0)-135(1) and the driver circuits 374(0)-374(1) can concurrently access different respective pages within different respective blocks of different memory planes when the different respective pages are of a different page type.

Figure 4:
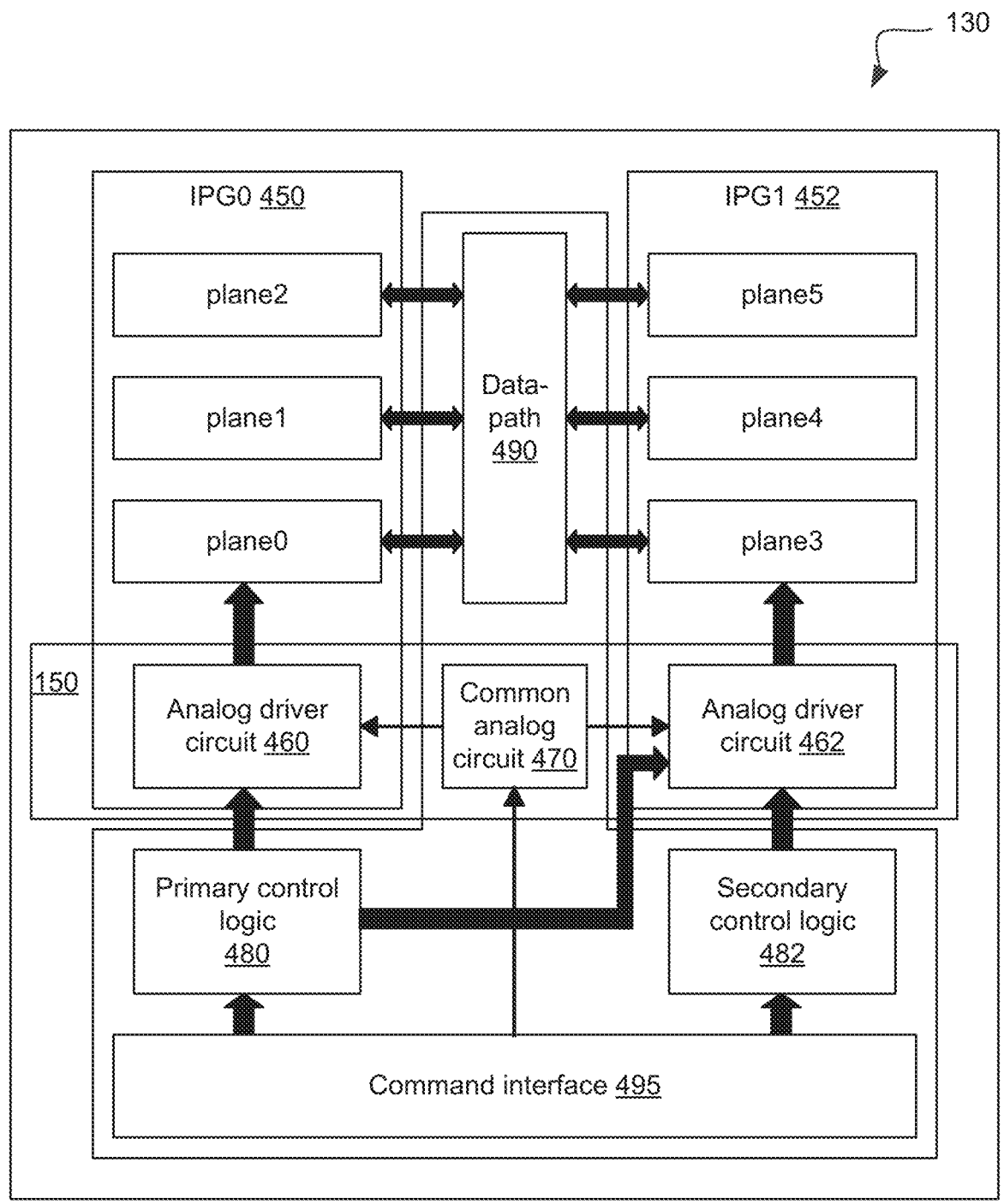
FIG. 4 is a block diagram illustrating independent plane architecture in a memory device in accordance with some embodiments of the present disclosure.

FIG. 4 is a block diagram illustrating independent plane architecture in a memory device 130 in accordance with some embodiments of the present disclosure. As illustrated, memory device 130 includes a number of memory planes (i.e., plane0-plane5) arranged in two independent plane groups (IPGs) 450 and 452. In other embodiments, there can be any number of memory planes and/or any other number of independent plane groups. Each of memory planes can include an array of memory cells formed at the intersections of wordlines and bitlines. In one embodiment, the memory cells are grouped in to blocks, which can be further divided into sub-blocks, where a given wordline is shared across a number of sub-blocks, for example. In one embodiment, each sub-block corresponds to a separate plane in the memory array. The group of memory cells associated with a wordline within a sub-block is referred to as a physical page. Each physical page in one of the sub-blocks can include multiple page types. For example, a physical page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and QLC physical page types are LPs, UPs, XPs and top logical pages (TPs). For example, a physical page formed from memory cells of the QLC memory type can have a total of four logical pages, where each logical page can store data distinct from the data stored in the other logical pages associated with that physical page. Depending on the programming scheme used, each logical page of a memory cell can be programmed in a separate programming pass, or multiple logical pages can be programmed together. For example, in a QLC physical page, the LP can be programmed on one pass, and the UP, XP and TP can be programmed on a second pass. Other programming schemes are possible.

In one embodiment, each of independent plane groups 450 and 452 has an associated independent analog driver circuit 460 and 462. Independent analog driver circuits 460 and 462 can be representative of drivers 374(0)-374(1) of FIG. 3. In one embodiment, there is a shared common analog circuit 470. Common analog circuit 470 can be representative of common circuit 375 of FIG. 3. Together, independent analog driver circuits 460 and 462 and common analog circuit 470 form independent plane architecture circuitry 150. Depending on the embodiment, independent plane architecture circuitry 150 can include additional and/or different components. In one embodiment, memory device further includes a common datapath 490 shared by the independent plane groups 450 and 452, and a common command interface 495. In one embodiment, the independent analog driver circuits 460 and 462 are configured to provide selected analog voltage references received from the common analog circuit 470 to memory planes of the independent plane groups 450 and 452 in order to perform memory access operations. For example, common analog circuit 470 can include a number of analog references that represent first order references (e.g., bandgap, page buffer references, thermometer) and other second order references for the separate analog driver circuits 460 and 462. Common analog circuit 470 can further includes power on/power down detectors to tell when the memory die is to be powered up or when there is a power loss, as well as any other components that can be shared (e.g., only executed once to save power). Independent analog driver circuits 460 and 462, however, can include other components (e.g., DC converters, X and Y pad drivers) that operate independently without regard to other independent plane groups.

In one embodiment, each independent plane group 450 and 460 of the memory device 130 can have a corresponding respective media controller. For example, primary control logic 480 can be associated with independent plane group 450 and secondary control logic 482 can be associated with independent plane group 452. Primary control logic 480 and secondary control logic 482 can be representative of media controllers 135(0)-135(1) of FIG. 3. Each media controller is configured to execute memory access operations on the memory planes in the corresponding independent plane group (e.g., cause the corresponding respective analog driver circuit to apply a voltage signal received from the common analog circuit to a certain memory plane or memory planes of the corresponding independent plane group). Under certain circumstances, secondary control logic 482 can be disabled for power consumption purposes, and primary control logic 480 can execute operations on the memory planes of multiple independent plane groups (i.e. group 450 and group 452). When are both are still active, however, primary control logic 480 and secondary control logic 482 can perform asynchronous memory access operations on the memory planes of each respective independent plane group concurrently (e.g., at least partially overlapping in time), as illustrated in FIG. 5.

Figure 5:
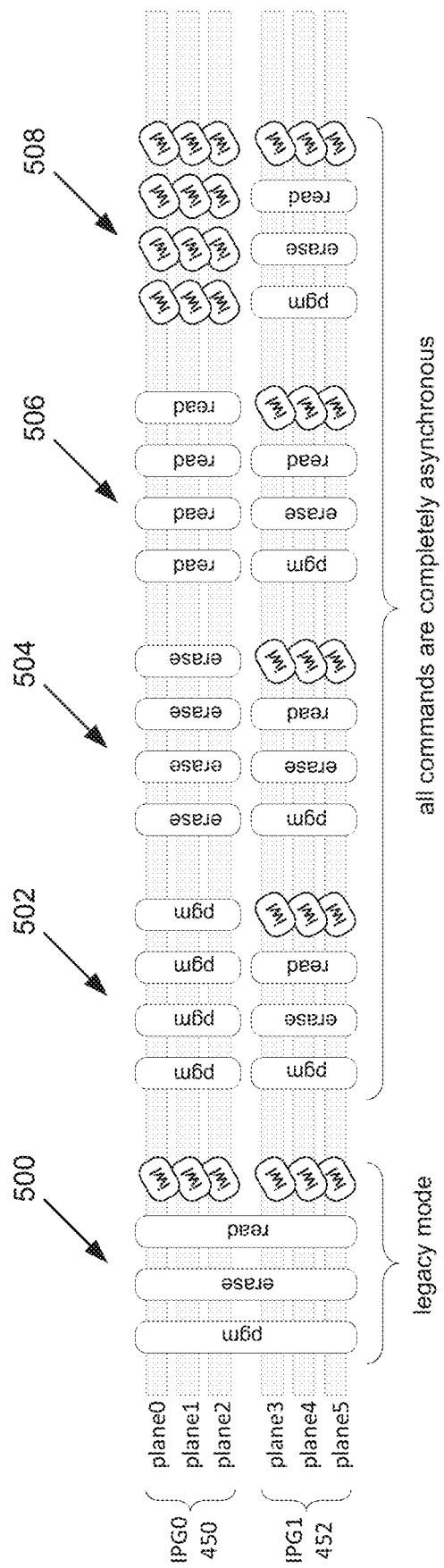
FIG. 5 is a diagram illustrating concurrent execution of memory access operations in a memory device with an independent plane architecture in accordance with some embodiments of the present disclosure.

FIG. 5 is a diagram illustrating concurrent execution of memory access operations in a memory device with an independent plane architecture in accordance with some embodiments of the present disclosure. When memory device 130 includes independent plane architecture circuit 150, as described above, primary control logic 480 and secondary control logic 482 can perform asynchronous memory access operations on the respective independent plane groups. For example, if primary control logic 480 is performing a program (pgm) operation on the memory planes of independent plane group 450 (IPG0), secondary control logic 482 can perform any of a program operation, an erase operation, a read operation, or one or more independent wordline (IWL) read operations on the memory planes of independent plane group 452 (IPG1), as shown at 502. Similarly, if primary control logic 480 is performing an erase operation on the memory planes of independent plane group 450 (IPG0), secondary control logic 482 can perform any of a program operation, an erase operation, a read operation, or one or more independent wordline (IWL) read operations on the memory planes of independent plane group 452 (IPG1), as shown at 504. In addition, if primary control logic 480 is performing a read operation on the memory planes of independent plane group 450 (IPG0), secondary control logic 482 can perform any of a program operation, an erase operation, a read operation, or one or more independent wordline (IWL) read operations on the memory planes of independent plane group 452 (IPG1), as shown at 506. Furthermore, if primary control logic 480 is performing one or more independent wordline (IWL) read operations on the memory planes of independent plane group 450 (IPG0), secondary control logic 482 can perform any of a program operation, an erase operation, a read operation, or one or more independent wordline (IWL) read operations on the memory planes of independent plane group 452 (IPG1), as shown at 508.

Referring again to FIG. 4, memory device 130 incorporates certain design features to reduce noise during concurrent asynchronous memory access operations. In one embodiment, the components of memory device 130 are physically segregated into certain sections. For example, since each of independent plane groups 450 and 452 and their corresponding analog driver circuits 460 and 462 utilize high current and have low headroom, they can each be in a separate section. In addition, since datapath 490, common analog circuit 470, primary control logic 480, secondary control logic 482, and command interface 495 utilize lower current and have higher headroom, these components can be disposed together in a section separate from the independent plane groups. The segregation can be achieved by using different voltage supplies/regulators, different metal routing, and different UI pads within different sections of memory device 130. In addition, there can also be a physical barrier in substrate between the sections (e.g., an n-doped region in between the p-doped regions where the circuitry is located). The segregation prevents negative side-effects associated with cross-noise during sensitive phases of the asynchronous memory access operations (e.g., when a noisy operation is occurring on independent plane group 450 concurrently with a sensitive operations occurring on independent plane group 452).

Figure 6:
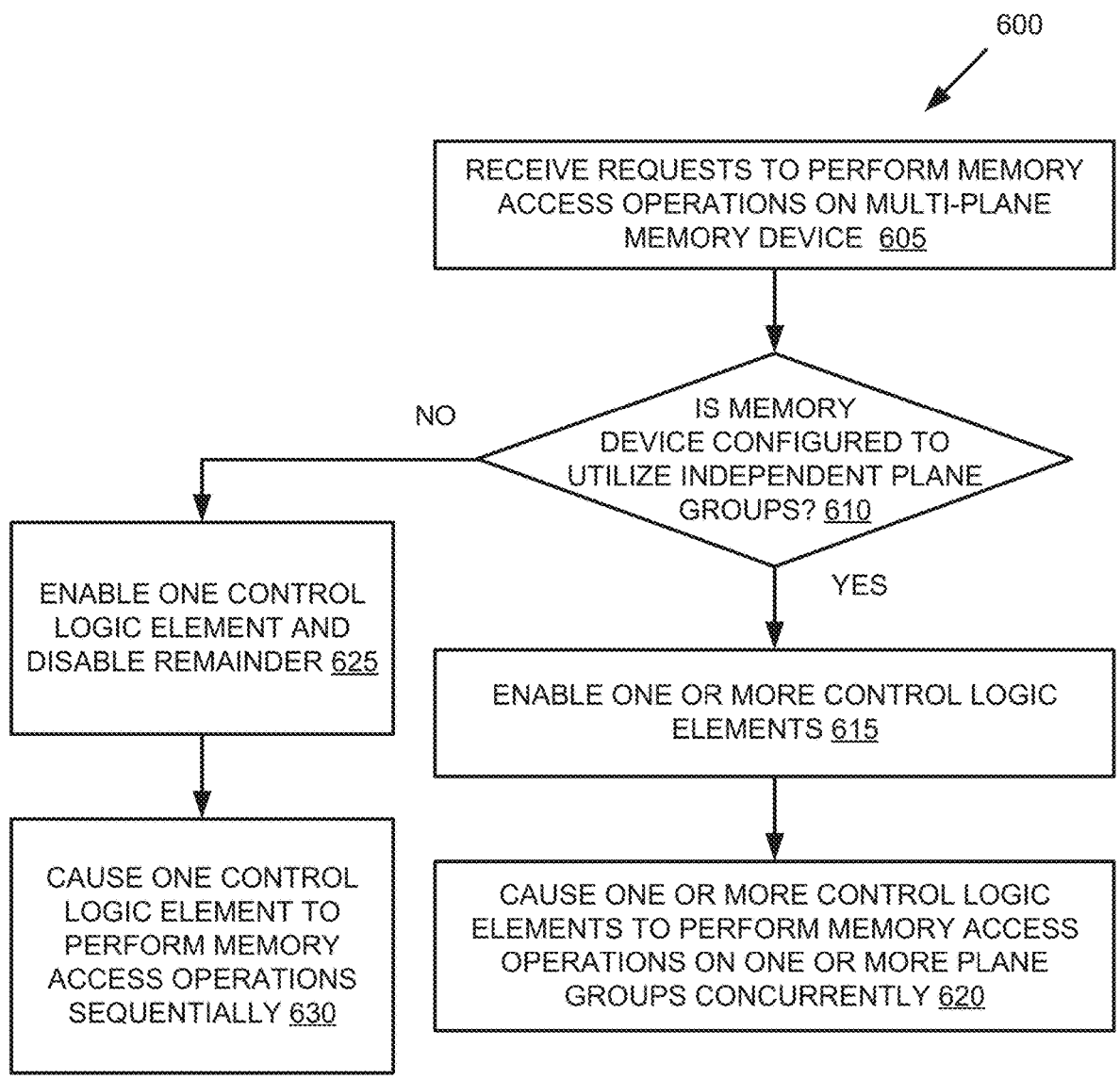
FIG. 6 is a flow diagram of an example method of power saving operations in a memory device with an independent plane architecture in accordance with some embodiments of the present disclosure.

FIG. 6 is a flow diagram of an example method of power saving operations in a memory device with an independent plane architecture in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by local media controller 135 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, requests are received. For example, memory device 130 can receive a number of memory access commands/requests to perform corresponding memory access operations. The requests can include respective address identifying corresponding locations in the memory array of memory device 130. Depending on the embodiment, the memory access operations can include read operations, program operations, erase operations, or some other type of operations. In one embodiment, the requests are received at command interface 495 from a requestor, such as memory interface 113 of memory sub-system controller 115 or host system 120.

At operation 610, a determination is made. For example, the control logic can determine whether memory device 130 is configured to utilize independent plane groups. In one embodiment, memory device 130 can be configured in either of two modes of operation, such as a first mode of operation or a second mode of operation. In the first mode of operation, one or more control logic elements can be enabled concurrently. In one embodiment, primary control logic 480 and secondary control logic 482 are both enabled (i.e., activated) to perform respective asynchronous memory access operations on the corresponding independent plane groups 450 and 452. In another embodiment, only one control logic element (e.g., secondary control logic 482) is enabled in response to a given request, while other control logic elements (e.g., primary control logic 480) remain available to process other requests. In the second mode of operation, only one control logic element is enabled while a remainder of the control logic elements are disabled. In one embodiment, primary control logic 480 is enabled and secondary control logic 482 is disabled (i.e., de-activated). In one embodiment, the mode of operation is set in response to a command or control signal received at command interface 495 (e.g., from memory interface 113 of memory sub-system controller 115 or host system 120).

If it is determined that the memory device is configured to utilize independent plane groups, at operation 615, one or more control logic elements are enabled. In one embodiment, primary control logic 480 and secondary control logic 482 are both enabled (i.e., activated) to perform respective asynchronous memory access operations on the corresponding independent plane groups 450 and 452. In one embodiment, primary control logic 480 sends a signal to secondary control logic 482 to cause secondary control logic 482 to be activated. In another embodiment, primary control logic 480 de-asserts a control signal that would otherwise be provided to analog driver circuit 462. In another embodiment, only one of primary control logic 480 or secondary control logic 482 is enabled in response to a given request, while other control logic element(s) remain available to process other requests, which can be received subsequently or concurrently.

At operation 620, concurrent memory access operations are performed. For example, memory device 130 can cause the primary control logic 480 and secondary control logic 482 to perform asynchronous memory access operations on the memory planes of independent plane groups 450 and 452 concurrently using respective independent analog driver circuits 460 and 462. In one embodiment, primary control logic 480 can cause analog driver circuit 460 to apply reference voltage signals from common analog circuit 470 to the memory planes of independent plane group 450 concurrently (i.e., at least partially overlapping in time) with secondary control logic 482 causing analog driver circuit 462 to apply reference voltage signals form common analog circuit 470 to memory planes of independent plane group 452.

If at operation 610 it is determined that memory device is not configured to utilize independent plane groups, at operation 625, only one control logic element is enabled while a remainder of the control logic elements are disabled. In one embodiment, primary control logic 480 is enabled and secondary control logic 482 is disabled (i.e., de-activated). In one embodiment, primary control logic 480 sends a signal to secondary control logic 482 to cause secondary control logic 482 to be de-activated. In another embodiment, primary control logic 480 asserts a control signal that is provided to analog driver circuit 462.

At operation 630, sequential memory access operations are performed. For example, memory device 130 can cause the primary control logic 480 to perform memory access operations on the memory planes of any of independent plane groups 450 and 452 sequentially using respective independent analog driver circuit 460 or 462. In one embodiment, primary control logic 480 can cause analog driver circuit 460 to apply reference voltage signals from common analog circuit 470 to the memory planes of independent plane group 450 or can cause analog driver circuit 462 to apply reference voltage signals form common analog circuit 470 to memory planes of independent plane group 452. As illustrated in FIG. 5, the second mode of operation functions as a legacy mode, where only one of a program operation, an erase operation, a read operation, or one or more independent wordline (IWL) read operations can be performed on the memory planes of either or both of independent plane group 450 (IPG0) or independent plane group 452 (IPG1) at a time, as shown at 500.

Figure 7:
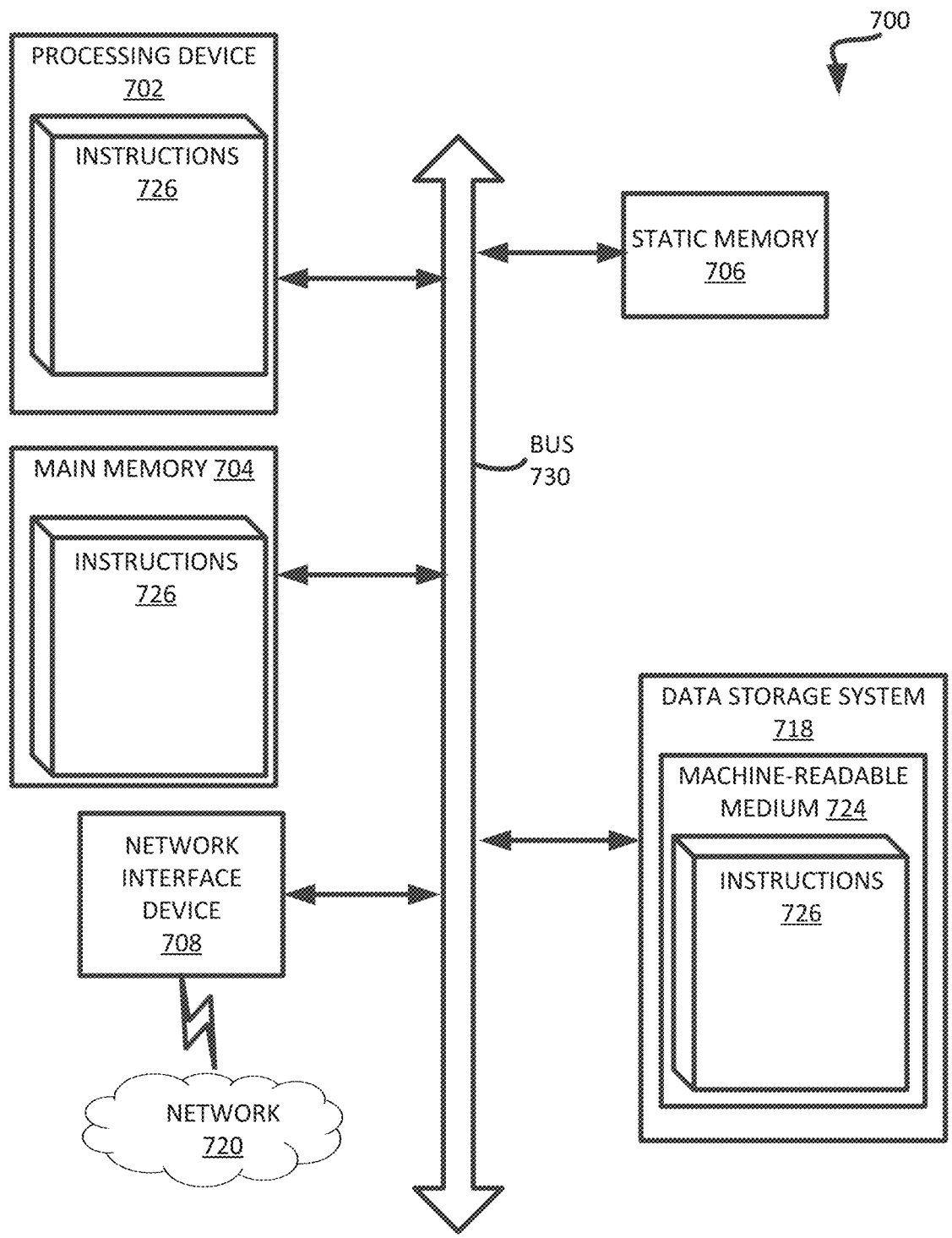
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium, such as a non-transitory computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
    a memory array comprising a plurality of memory planes, wherein the plurality of memory planes are arranged in a plurality of independent plane groups, and wherein each of the plurality of independent plane groups comprises one or more of the plurality of memory planes;
    a plurality of independent analog driver circuits coupled to the memory array, wherein a respective one of the plurality of independent analog driver circuits is associated with a respective one of the plurality of independent plane groups;

a common analog circuit coupled to the memory array, wherein the common analog circuit is shared by the plurality of independent analog driver circuits and the plurality of independent plane groups; and a plurality of control logic elements, wherein a respective one of the plurality of control logic elements is associated with a respective one of the plurality of independent analog driver circuits and a respective one of the plurality of independent plane groups, wherein, when the memory device is configured in a first mode of operation, the plurality of control logic elements are configured to perform asynchronous memory access operations of different types on memory planes of at least two of the plurality of independent plane groups concurrently using at least two of the plurality of independent analog driver circuits.

2. The memory device of claim 1, wherein a first control logic element of the plurality of control logic elements is selectively coupled to each of the plurality of analog driver circuits and each of the plurality of independent plane groups.

3. The memory device of claim 2, wherein, when the memory device is configured in a second mode of operation, the first control logic element of the plurality of control logic elements is enabled and a remainder of the plurality of control logic elements are disabled, and wherein the first control logic element is configured to perform a memory access operation on one or more memory planes of any of the plurality of independent plane groups using one or more of the plurality of independent analog driver circuits.

4. The memory device of claim 1, further comprising:
a common datapath shared by the plurality of independent plane groups; and
a common command interface shared by the plurality of control logic elements.

5. The memory device of claim 1, wherein each respective pair of one of the plurality of independent plane groups and one of the plurality of independent analog driver circuits is segregated from other pairs of the plurality of independent plane groups and the plurality of independent analog driver circuits and from the plurality of control logic elements for signal noise reduction.

6. The memory device of claim 1, wherein the common analog circuit comprises a plurality of analog voltage references associated with performing memory access operations in the memory device.

7. The memory device of claim 6, wherein the plurality of independent analog driver circuits are configured to provide selected ones of the plurality of analog voltage references received from the common analog circuit to memory planes of the respective ones of the plurality of independent plane groups to perform the memory access operations.

8. A memory device comprising:
a memory array comprising a plurality of memory planes, wherein a first subset of the plurality of memory planes are associated with a first independent plane group and a second subset of the plurality of memory planes are associated with a second independent plane group;
a first independent analog driver circuit associated with the first independent plane group and a second independent analog driver circuit associated with the second independent plane group;
a common analog circuit coupled to the memory array, wherein the common analog circuit is shared by the first and second independent analog driver circuits and the first and second independent plane groups; and a first control logic element associated with the first independent analog driver circuit and the first independent plane group and a second control logic element associated with the second independent analog driver circuit and the second independent plane group, wherein, when the memory device is configured in a first mode of operation, the first control logic element is configured to perform a first asynchronous memory access operation on the first independent plane group using the first independent analog driver circuit and the second control logic element is configured to perform a second asynchronous memory access operation on the second independent plane group using the second independent analog driver circuit concurrently, and wherein the first control logic element is selectively coupled to the second independent analog driver circuit and the second independent plane group.

9. The memory device of claim 8, wherein, when the memory device is configured in a second mode of operation, the first control logic element is enabled and the second control logic element is disabled, and wherein the first control logic element is configured to perform a memory access operation on one or more memory planes of any of the first and second independent plane groups using one or more of the first and second independent analog driver circuits.

10. The memory device of claim 8, further comprising:
a common datapath shared by the first and second independent plane groups; and
a common command interface shared by the first and second control logic elements.

11. The memory device of claim 8, wherein the first independent plane group and the first independent analog driver circuit are segregated from the second independent plane group and the second independent analog driver circuits and from the first and second control logic elements for signal noise reduction.

12. The memory device of claim 8, wherein the common analog circuit comprises a plurality of analog voltage references associated with performing memory access operations in the memory device.

13. The memory device of claim 12, wherein the first and second independent analog driver circuits are configured to provide selected ones of the plurality of analog voltage references received from the common analog circuit to memory planes of the first and second independent plane groups to perform the memory access operations.

14. A method comprising:
receiving, at a memory device, a plurality of requests to perform memory access operations of different types on a memory array of the memory device, the memory array comprising a plurality of memory planes, wherein the plurality of memory planes are arranged in a plurality of independent plane groups, and wherein each of the plurality of independent plane groups comprises one or more of the plurality of memory planes;
determining whether the memory device is configured to utilize independent plane groups;
responsive to determining that the memory device is configured to utilize independent plane groups, enabling a plurality of control logic elements, wherein a respective one of the plurality of control logic elements is associated with a respective one of the plurality of independent plane groups; and
causing the plurality of control logic elements to perform the memory access operations of different types on the memory planes of the two or more of the plurality of independent plane groups concurrently using respective ones of a plurality of independent analog driver circuits.

15. The method of claim 14, further comprising:
responsive to determining that the memory device is not configured to utilize independent plane groups, enabling a first control logic element of the plurality of control logic elements and to disable a remainder of the plurality of control logic elements; and
causing the first control logic element to perform the memory access operations on memory planes of one or more of the plurality of independent plane groups sequentially using a respective one of the plurality of independent analog driver circuits.

16. The method of claim 14, wherein the memory device comprises a common analog circuit coupled to the memory array, and wherein the common analog circuit is shared by the plurality of independent plane groups.

17. The method of claim 14, wherein the plurality of requests to perform the memory access operations are received at a common command interface of the memory device shared by the plurality of control logic elements.

* * * * *